(12) United States Patent
Li et al.

(10) Patent No.: US 11,108,469 B2
(45) Date of Patent: Aug. 31, 2021

(54) MODE DEMULTIPLEXING HYBRID APPARATUS, METHODS, AND APPLICATIONS

(71) Applicant: UNIVERSITY OF CENTRAL FLORIDA RESEARCH FOUNDATION, INC., Orlando, FL (US)

(72) Inventors: Guifang Li, Orlando, FL (US); He Wen, Orlando, FL (US)

(73) Assignee: UNIVERSITY OF CENTRAL FLORIDA RESEARCH FOUNDATION, INC., Orlando, FL (US)

(*) Notice: Subject to any disclaimer, the term of this patent is extended or adjusted under 35 U.S.C. 154(b) by 0 days.

(21) Appl. No.: 16/906,192

(22) Filed: Jun. 19, 2020

(65) Prior Publication Data

US 2020/0403710 A1  Dec. 24, 2020

Related U.S. Application Data

(60) Provisional application No. 62/863,601, filed on Jun. 19, 2019.

(51) Int. Cl.
| | |
|---|---|
| H04B 10/61 | (2013.01) |
| H04J 14/04 | (2006.01) |
| H04J 14/06 | (2006.01) |
| G02B 27/10 | (2006.01) |

(52) U.S. Cl.
CPC .......... *H04B 10/615* (2013.01); *G02B 27/10* (2013.01); *H04B 10/6162* (2013.01); *H04B 10/6166* (2013.01); *H04J 14/04* (2013.01); *H04J 14/06* (2013.01)

(58) Field of Classification Search
CPC ............. H04B 10/615; H04B 10/6166; H04B 10/6162; G02B 27/10–16; H04J 14/04; H04J 14/06
See application file for complete search history.

(56) References Cited

U.S. PATENT DOCUMENTS

2017/0363415 A1* 12/2017 Frisken .............. G01B 9/02028
2020/0409141 A1* 12/2020 Pinel .................... G02B 6/2817

OTHER PUBLICATIONS

Igarashi et al, "114 Space-Division-Multiplexed Transmission over 9.8-km Weakly-Coupled-6-Mode Uncoupled-19-Core Fibers" (published in Optical Fiber Communications Conference, Mar. 2015) (Year: 2015).*
Labroille et al, "Characterization and applications of spatial mode multiplexers based on Multi-Plane Light Conversion" (published in Optical Fiber Technology, vol. 25, pp. 93-99, Feb. 2017) (Year: 2017).*
Labroille et al, "Efficient and mode selective spatial mode multiplexer based on multi-plane light conversion" (published in Optics Express vol. 22, Issue 13, p. 15599-1560, 2014) (Year: 2014).*

* cited by examiner

*Primary Examiner* — Casey L Kretzer
(74) *Attorney, Agent, or Firm* — Klintworth & Rozenblat IP LLP

(57) ABSTRACT

A mode demultiplexing hybrid (MDH) that integrates mode demultiplexing, local oscillator power splitting, and optical 90-degree hybrid using multi-plane light conversion (MPLC). Reflective cavity and transmissive systems are disclosed. The MDH may fine advantageous application as the optical front end for a coherent receiver in a space-division multiplexing (SDM) system.

6 Claims, 14 Drawing Sheets

| Symbol | Meaning | Evaluation |
|---|---|---|
| $\Delta IL_{k,sig}$, $\Delta IL_{k,LO}$ | Intra-port power uniformity for the $k^{th}$ mode/LO assigned to the $k^{th}$ mode (spot power difference in each output port) | $\Delta IL_k = \max_{i \in \{1,2,3,4\}} P_{k,i} / \min_{i \in \{1,2,3,4\}} P_{k,i}$ |
| $\Delta \theta_{k,sig}$, $\Delta \theta_{k,LO}$ | Phase retardation deviation for the $k^{th}$ mode/LO assigned to the $k^{th}$ mode (real phase spot phase retardation deviation from the desired value) | $\Delta \theta_{k,sig} = \arg\left(\iint_{s_1} A_k \Phi_k dxdy - \iint_{s_3} A_k \Phi_k dxdy\right)$ $-\arg\left(\iint_{s_2} A_k \Phi_k dxdy - \iint_{s_4} A_k \Phi_k dxdy\right) - \pi/2$ $\Delta \theta_{k,LO} = \arg\left(\iint_{s_1} A_k \Phi_k dxdy + \iint_{s_3} A_k \Phi_k dxdy\right)$ $-\arg\left(\iint_{s_2} A_k \Phi_k dxdy + \iint_{s_4} A_k \Phi_k dxdy\right)$ |
| $IL$ | Insertion loss of an MDH | $10\log \sum_{k=1}^{M} \lambda_k^2 / M$ |
| $MDL$ | Mode dependent loss of an MDH | $10\log\left(\lambda_{max}^2 / \lambda_{min}^2\right)$ |
| $Xtalk$ | Aggregate mode crosstalk of an MDH | $Xtalk = 10\log\left[\sum\sum |M_c|^2 - \text{diag}(|M_c|^2)\right] - 10\log\sum \text{diag}(|M_c|^2)$ |
| $\Delta dual_k$ | Dual uniformity for the $k^{th}$ mode | $\Delta dual_k = 10\log 10 \frac{|\max(I_{i,k}(\varphi)) - \min(I_{i,k}(\varphi))|}{|\max(I_{q,k}(\varphi)) - \min(I_{q,k}(\varphi))|}$ |
| $\Delta \varphi_k$ | Phase error between the in-phase and quadrature components of the $k^{th}$ mode (including | $\Delta \varphi_k = \arcsin\left[\int_0^{2\pi} \tilde{I}_{i,k}(\varphi)\tilde{I}_{q,k}(\varphi)d\varphi / \pi\right]$ |

$A_k, \Phi_k(x,y)$ Amplitude and field profile of spots in the $k^{th}$ mode output $P_{k,i} = \iint_{s_{k,i}} |A_k \Phi_k(x,y)|^2 dxdy$ The power of spot i in the kth mode output $\lambda_k$: the kth singular value of coupling matrix $M_c$; M: number of modes diag($M_c$): diagonal elements of the coupling matrix $I_{i,k}(\varphi)$, $I_{q,k}(\varphi)$: The photocurrents with balanced detection as a function of phase shift of input mode k. $\tilde{I}_{i,k}(\varphi), \tilde{I}_{q,k}(\varphi)$: The photocurrents $I_{i,k}(\varphi)$, $I_{q,k}(\varphi)$ with their DC offset removed

FIG. 14

MODE DEMULTIPLEXING HYBRID APPARATUS, METHODS, AND APPLICATIONS

RELATED APPLICATION DATA

This application claims priority to Provisional U.S. Patent Application No. 62/863,601 filed Jun. 19, 2019, the subject matter of which is incorporated by reference in its entirety.

GOVERNMENT FUNDING

Funding for the invention was provided by the Army Research Office under contract numbers W911NF1710553 and W911NF1710500. The U.S. government has certain rights in the invention.

BACKGROUND

Non-limiting aspects and embodiments most generally pertain to apparatus and methods for improving the integrity of received optical signals degraded by transmission between point A and point B; more particularly to apparatus and methods that simplify and make more reliable and robust coherent optical signal communications systems, and most particularly to a mode demultiplexing hybrid (MDH) apparatus and method that can simultaneously perform mode demultiplexing, local oscillator power splitting, and optical 90-degree phase deconstruction using multi-plane light conversion (MPLC). Said MDH may find application as, e.g., the coherent optical front-end of a mode-division multiplexing (MDM) receiver.

Space-division multiplexing (SDM) that utilizes the spatial domain as a physical dimension for communication has been explored to increase the fiber-optic transmission capacity by overcoming the nonlinear Shannon capacity limit imposed by fiber nonlinear effects. Employing spatial modes as well as fiber cores can significantly increase system capacity and/or spectral efficiency, improve system performance, or reduce system cost. To fully compensate the linear impairments to a signal during transmission, coherent detection together with digital signal processing are employed to retrieve both amplitude and phase of the signal. The coherent optical frontend of a mode-division multiplexing (MDM) receiver includes a mode de-multiplexer and an optical 90-degree hybrid for each mode M. The mode de-multiplexer separates all M spatial modes and converts them to the fundamental modes. An optical 90-degree hybrid mixes each demultiplexed mode with a local oscillator (LO) to extract the in-phase and quadrature components of the signal. The required number of optical 90-degree hybrids is equal to the number of mode channels. For wavelength-division multiplexed (WDM) systems with N wavelength channels, the required number of optical 90-degree hybrid is M×N (for single polarization, doubled for polarization multiplexing). These hybrids take a large footprint and make the receivers complicated. While available integration techniques are able to integrate an optical 90-degree hybrid with a balanced photodetector to reduce the overall footprint, active control of phase shift retardation in the optical 90-degree hybrid is generally necessary, which increases system power dissipation.

The inventors have recognized the benefits and advantages of apparatus and methods that enable a single device (referred to herein as a "Mode-Demultiplexing Hybrid," "MDH") to simultaneously realize mode de-multiplexing and optical 90-degree mixing using multiplane light conversion (MPLC), to simplify the structure of the coherent optical frontend. With broad bandwidth, the MDH could operate across multiple wavelength-MDM channels, therefore conventional mode de-multiplexer and the M×N optical 90-degree hybrids could be replaced by a single MDH. Furthermore, the stable 90-degree phase shift retardation offered by the embodied MDH would eliminate the need for phase stabilization, in contrast to waveguide-based optical 90-degree hybrids, resulting in power savings.

From the functionality point of view, the said MDH is a multichannel optical 90-degree hybrid sharing the same LO that enables either independent or cooperative channel detection, because all channels have a common reference beam. In independent channel detection, the phase shifts between channels are not concerned, a typical case is MDM/SDM; whereas in cooperative channel detection, the phase shifts between channels are retrieved, a typical case is wavefront sensing and reconstruction. As a generalization of single-channel optical 90-degree hybrid which is only applicable to signals with planar wavefront, the said MDH is applicable to signals with spatial varying wavefront which can be decomposed either into orthogonal modes or into non-overlapped partitions. Obtaining the wavefront of an arbitrary beam is dispensable for many applications, such as, e.g., optical communications, remoting sensing, and imaging.

The underlying principle for the versatile functionalities of the MDH is that arbitrary unitary transforms can be realized by MPLC. Since the operation of mode-demultiplexing, power splitting, and 90-degree hybrids are all unitary transforms, they can be integrated together as a composite unitary transform and realized by MPLC. Such apparatus and methods are enabled as described herein below and in the appended claims.

SUMMARY

An aspect of the invention is a mode demultiplexing hybrid (MDH) apparatus. In an exemplary, non-limiting embodiment, the MDH includes an entrance plane adapted to receive inputs including a signal having a specified phase/amplitude profile and a reference, wherein the signal and reference inputs are spatially separated, occupy non-overlapped areas, and can coherently interfere; a multi-plane light converter (MPLC) having an input optically coupled to the signal and reference inputs; and an exit plane optically coupled to an output of the MPLC, wherein the output of the MPLC comprises a plurality of spatially overlapping signal and reference spots, each spot having a different respective phase shift imposed by the MPLC such that all of the output spots are mutually orthogonal, wherein a single MDH enables mode demultiplexing and optical 90-degree mixing of the inputs. In various non-limiting, exemplary embodiments the MDH may have one or more of the following features, characteristics, limitations, or functions alone or in various combinations:

wherein the input signal is at least one of spatially multiplexed, multiple orthogonal spatial modes including linearly-polarized (LP) modes, Hermite Gaussian (HG) modes, or Laguerre Gaussian (LG) modes and one beam divided into multiple non-overlapped, sub-apertured segments;

wherein the input reference is a local oscillator (LO);

wherein the MPLC is a reflective cavity MPLC including a planar phase plate having N sections with different phase patterns, each of which acts as one phase mask, and a planar mirror, separated by free space;

wherein at least one of the entrance plane and the exit plane overlap with the first and last phase mask, respectively;
wherein the MPLC is a transmissive MPLC including N planar phase masks having different phase patterns;
wherein at least one of the entrance plane and the exit plane overlap with the first and last phase mask, respectively;
wherein the input signal is comprised of spatially overlapping, orthogonal LP modes and the required least number of phase masks is the number of LP modes plus one;
wherein the input signal is comprised of spatially overlapping, orthogonal HG modes and the required least number of phase masks is most predictably the square root of the number of HG modes;
wherein the input signal is comprised of a sub-apertured sampled beam and the required least number of phase masks is most predictably the square root of the number of sub-apertures;
further comprising a plurality of gradient refractive index (GRIN) rods and a plurality of different phase masks each operatively coupled to an end of a GRIN rod;
further comprising an anti-reflection coating on the phase masks;
further comprising a plurality of phase plates each disposed at a focal plane of a succession of on-axis lenses, of which the back focal plane of the predecessor is overlapped with the font focal plane of the successor;
wherein the MDH is the front-end component of a mode-division multiplexing (MDM) optical receiver;
wherein the MDH is a wavefront sensor.

An aspect of the invention is a method for designing a MDH. In an exemplary, non-limiting embodiment, the method includes the steps of: a) choosing input parameters, including beam sizes, the positions of signals and LO, the size and resolution of an entrance plane; b) identifying an output spot array including the arrangement and shape of the output spot array to minimize a number of phase masks; c) estimating the number, size, resolution and spacing of the phase masks using iterative performance evaluations; d) computing the phase patterns on the phase masks; e) evaluating the performance of the MDH from the output spots; and f) if the performance is satisfactory, then ending; or g) if the performance is not satisfactory, then iterating N times where $N_{th}$ is a threshold value, where, if $N<N_{th}$, then proceed to step (c), or if $N>N_{th}$, then proceed to step (b). In various non-limiting, exemplary embodiments and aspects the method may include one or more of the following steps, features, characteristics, limitations, or functions alone or in various combinations:
wherein the step of computing the phase patterns on the phase masks further comprises using a modified WFM algorithm;
wherein the step of evaluating the performance of the MDH from the output spots further comprises one or more of:
intra-port power uniformity for the $k^{th}$ mode/LO assigned to the $k^{th}$ mode;
phase retardation deviation for the $k^{th}$ mode/LO assigned to the $k^{th}$ mode;
insertion loss of MDH;
mode dependent loss of MDH;
aggregate mode crosstalk of MDH;
dual uniformity for the $k^{th}$ mode;
phase error between the in-phase and quadrature components of the $k^{th}$ mode.

BRIEF DESCRIPTION OF THE DRAWINGS

FIG. 1(a) illustrates a mode multiplexer converting two separated input beams to two overlapped orthogonal beams. FIG. 1(b) illustrates interferometrically combining two separated input beams. FIG. 1(c) illustrates optical 90-degree hybrid mixing of two separated input beams. FIG. 1(d) illustrates mode de-multiplexing and optical 90-degree hybrid mixing, separating and converting orthogonal overlapped modes and mixing with respective local oscillators. The phase retardation of other beams relative to the first beam are marked alongside.

FIG. 14 is a chart listing MDH performance evaluation parameters in conjunction with FIG. 13.

DETAILED DESCRIPTION OF NON-LIMITING, EXEMPLARY EMBODIMENTS

Figure 1:
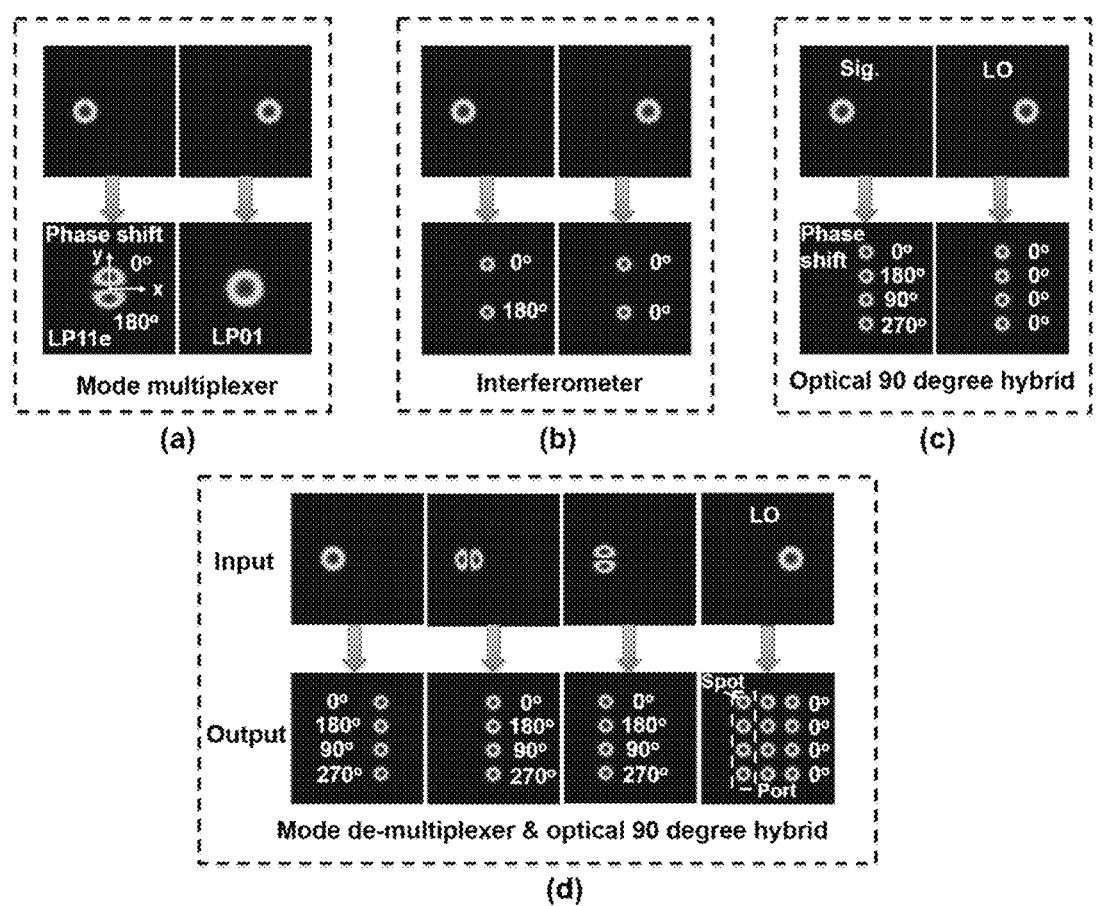
FIG. 1 illustrates input to output mapping for MPLC based devices.

Disclosed embodiments are described with reference to the attached figures, wherein like reference numerals are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships and methods are set forth to provide a more complete understanding of the embodiments disclosed herein.

An aspect of the invention is a single device called a mode demultiplexing hybrid (MDH), enabling simultaneous mode de-multiplexing and optical 90-degree mixing using multiplane light conversion (MPLC). The underlying principle for the versatile functionalities of the MDH is that arbitrary unitary transforms can be realized by MPLC. Since the operation of mode-demultiplexing, power splitting, and 90-degree hybrid are all unitary transforms, they can be integrated together as a composite unitary transform and realized by MPLC.

We first describe herein below the principle behind MPLCs to construct component devices, such as interferometers, optical 90-degree hybrids, and mode demultiplexers. We then further describe non-limiting, exemplary embodiments of reflective and transmissive MDHs.

Principle of MPLC Based Optical 90-Degree Hybrids

MPLC is a special unitary transform, which is composed of a sequence of phase modulations followed by a fixed linear transformation, such as optical Fourier transform or Fresnel transform. Basically, with sufficient numbers of phase modulations, MPLC approaches an arbitrary unitary transform with an error smaller than a desired value. It is very useful in optics because a simple input beam can be losslessly converted into a beam with a complex profile. If the input beams are orthogonal (zero of overlap integral in transverse plane), the outgoing beams are also orthogonal. There are two common forms of orthogonality. One is that the input beams have no spatial overlap. The other is that the input beams are spatially overlapped but with different symmetries. Physically, an exemplary transmissive MPLC can be realized by placing multiple phase plates at the focal plane of a succession of on-axis lenses, of which the back focal plane of the predecessor is overlapped with the font focal plane of the successor. In another exemplary transmissive MPLC, a linear series of gradient refractive index (GRIN) rods having a phase mask disposed on a face of each GRIN rod is disclosed. An exemplary reflective cavity MPLC comprises a planar phase plate and an opposing planar mirror separated by free space. The planar phase plate consists of N sections with different phase patterns, each of which acts as one phase mask. These exemplary embodiments will be described in detail below.

MPLC has demonstrated its powerful ability in quantum optics as mode sorters and in classical optical fiber communication as mode multiplexers (MUXs)/Demultiplexers (De-MUXs), capable of processing as many as 325 modes. It is worth noting that in these reported applications, MPLC was used only to convert one beam to another beam without other signal processing ability.

To realize effective signal processing, the input signal must be split into many copies and combined with a desired set of weights or coefficients. The MPLC inherently possesses such an ability because optical beams in MPLCs propagate mostly in free space. First, the MPLC can easily split one beam into a set of beams, or similarly for beams overlapping, with phase patterns on each phase plane. Second, orthogonality between beams is defined over an appropriate spatial domain and is generally not preserved over a part of the original spatial domain. As a result, different combining coefficients can be realized by integrating over different parts of the original spatial domain. Third, in contrast to waveguide-based interconnect devices (e.g., interferometer), it is easier for MPLCs to realize the cross-connects and interconnects of multiple input beams to facilitate signal processing, as optical beams in MPLCs propagate mostly in free space. No longer confined in waveguides, MPLC-based cross-connects and interconnects are less affected by environment perturbations such as temperature drift and vibration. The high stability is achieved at the cost of lack of flexibility, such as tunability of power splitting ratio and operating wavelength; however, in some devices such as the optical 90 degree hybrid, stability is more important than flexibility.

FIG. 1(a) illustrates two coherent input beams in the fundamental Gaussian mode located in different positions. The two beams are therefore orthogonal to each other. An MPLC processor can convert the two beams into two overlapped beams, one in linearly-polarized (LP) $LP_{01}$ mode, another in the $LP_{11e}$ mode with the same center. This is the well-known mode multiplexer. We note that the two lobes of the $LP_{11}$ mode are out of phase with equal power. If we chose the overlapped fields of the two lobes in the $LP_{11e}$ mode with the $LP_{01}$ as two separate outputs, they are simply the outputs of a two-port interferometer.

The two lobes of the converted $LP_{11}$ mode do not necessarily have to be close together; they can be separated far apart and have the same spatial distributions as the fundamental mode, as shown in FIG. 1(b). We will call these separated components 'spots' hereafter. Basically, the first input Gaussian beam can be converted into two spatially-separated, out-of-phase spots by an MPLC. Similarly, the second input Gaussian beam is converted by the same MPLC into two spatially-separated, in-phase spots overlapped with the two spots from the first Gaussian beam, as shown in FIG. 1(b). An MPLC can implement such a conversion because the output beams (including all spots as a whole) remain orthogonal. Such an MPLC performs the function of a symmetric optical interferometer.

MPLC-Based Optical 90-Degree Hybrids

To realize an optical 90-degree hybrid, we provide two symmetric interferometers having a phase offset difference of 90 degrees between each other. An MPLC can do this easily. In FIG. 1(c), we convert each of the input beams, representing the signal and the LO, into four separate spots, the profile of which are all the same. To make this conversion feasible, the output beams must be orthogonal. One of the possible solutions is to make the pair-wise differences in phase shift retardation between four groups of spots from the two input beams as 0, π, π/2 and −π/2 so that $$\iint E_1 E_2^* dx dy =$$

$$A_1 A_2^* \exp(i\theta) \times \begin{bmatrix} \iint_{S_1} \Phi^2 dx dy + \iint_{S_2} \Phi^2 dx dy \exp(i\pi) + \\ \iint_{S_3} \Phi^2 dx dy \exp(i\frac{\pi}{2}) + \iint_{S_4} \Phi^2 dx dy \exp(-i\frac{\pi}{2}) \end{bmatrix} = 0$$

that is, the output beams remain orthogonal. The subscript $S_i$ (i=1,2,3,4) denotes the integral area of spot i, $\Phi$ is the out beam profile. The optical power of these four separated spots in the same group are $$\begin{bmatrix} P_{o1} \\ P_{o2} \\ P_{o3} \\ P_{o4} \end{bmatrix} = \frac{1}{4}(P_1 + P_2) + \frac{1}{2}\sqrt{P_1 P_2} \begin{bmatrix} \cos\theta \\ -\cos\theta \\ \sin\theta \\ -\sin\theta \end{bmatrix}$$

They are exactly the outputs of a standard optical 90-degree hybrid. The in-phase and quadrature components of signal wave projected onto LO are proportional to the balanced detections $P_{o1}-P_{o2}$ and $P_{o3}-P_{o4}$, in which the unwanted DC component $(P_1+P_2)/4$ is suppressed where $P_1$ and $P_2$ are the power of the input beams.

A variation of this 90-degree hybrids is replacing the four output spots with three spots. The pair-wise difference in phase shift retardation between the three groups of spots from the LO and signal is 0, 2π/3 and −2π/3, respectively. In this case, the LO and signal are still orthogonal at the exit plane that is realizable by MPLC. The optical power of the three output spots are functions of the power of the input beams.

$$\begin{bmatrix} P_{o1} \\ P_{o2} \\ P_{o3} \end{bmatrix} = \frac{1}{3}(P_1 + P_2) + \frac{2}{3}\sqrt{P_1 P_2} \begin{bmatrix} \cos\theta \\ \cos\left(\theta + \frac{2\pi}{3}\right) \\ \cos\left(\theta - \frac{2\pi}{3}\right) \end{bmatrix}$$

Therefore, the in-phase ($I_i$) and quadrature ($I_q$) components of signal wave projected onto LO are proportional to $$I_i \propto P_{o1} - \frac{P_{o2} + P_{o3}}{2}$$

$$I_q \propto \frac{\sqrt{3}}{2}(P_{o2} - P_{o3})$$

The phase retardations introduced by the MPLC are very stable for three reasons: 1) The phase retardations between output spots are introduced by all the phase plates in MPLC. Phase retardation deviation at one pixel in a previous phase plate will affect all pixels in the next phase plate equally due to the fixed canonical linear transformation between two phase plates. 2) The phase retardation deviations of many pixels affect all the outputs almost the same, because the beams are dispersed, overlapped in space, sharing common area of phase plates. A manifestation of this tolerance of MPLC is the fact that the quantized phase shifts provided by gray-scale lithography can generate desired beams with high quality. 3) The dominant light path in MPLC is free space, which is relatively immune to environment perturbations. A proof of the stable phase retardation is that the generated high order modes, which contain phase retardation in adjacent lobes, are stable. Consequently, the phase retardation offered by MDH doesn't need control for stabilization, which is often used in waveguide based devices in contrast.

Mode Demultiplexing Optical 90-Degree Hybrids

The single-mode optical 90-degree hybrid can be generalized to a mode demultiplexing hybrid as shown in FIG. 1(d). The input beams are M spatially-overlapping, orthogonal modes. They are converted to non-overlapped beams, each composed of four spots with phase retardations of 0, π/2, π and −π/2. Each spot will be detected separately. The LO is split into M groups, each having four spots with the same phase retardation. Each group of spots from the LO is perfectly overlapped with the group of spots of the demultiplexed mode. They are called output port for a certain mode, marked by a dashed rectangle in FIG. 1(d). In such a configuration, a device performing mode demultiplexing and multichannel optical 90-degree hybrid is realized. The required number of phase plates for the MDH is one more than that for the same mode demultiplexer. Generally, the number of phase plate is determined by the number of independent modes. The extra phase plate is required for power splitting of the LO. The simple structure of the MDH benefits from the complex cross-connects and interconnects enabled by the beam splitting and combining in free-space cross without constraints of waveguides.

Figure 2:
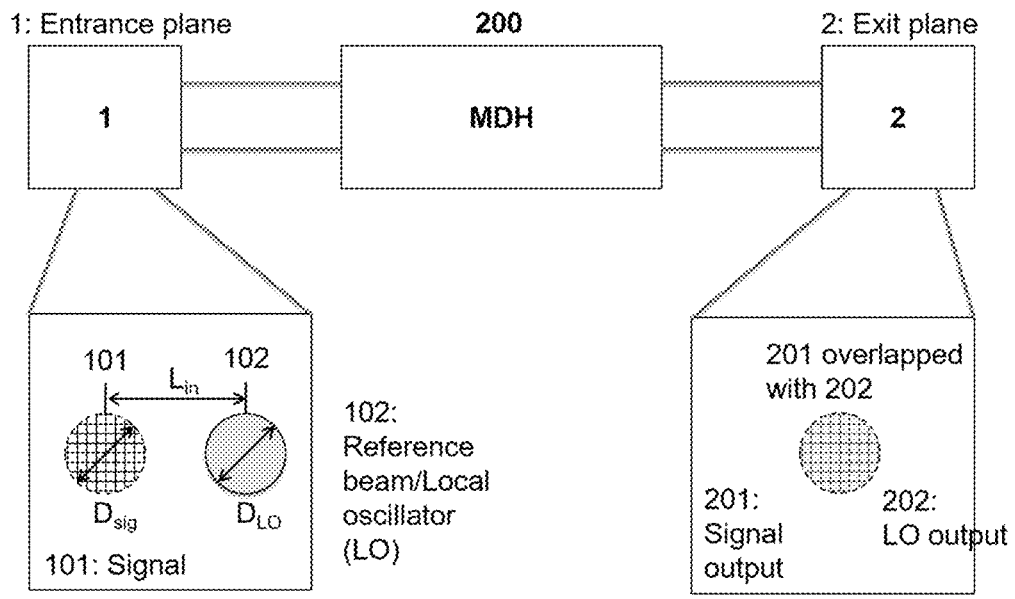
FIG. 2 schematically shows a mode demultiplexing hybrid (MDH) based on MPLC.

FIG. 2 schematically shows a mode demultiplexing hybrid (MDH) 200 based on MPLC. The MDH has two inputs, one for signal (e.g., multiple orthogonal spatial modes multiplexed spatially 101) and the other for a reference beam referred to herein as the local oscillator (LO 102). Generally, the LO and the signal are coherent in time and space such that mixing them leads to interference. The two inputs are spatially separated, occupying non-overlapped areas in the entrance plane of the MPLC ($L_{in} > D_{sig} + D_{LO}$, where $L_{in}$ is the spacing between the center of signal and LO beam, and $D_{sig}$ and $D_{LO}$ are the diameters of signal and LO beam, respectively). These parameters constrained by output coupling conditions, are optimized in iterative calculation of phase masks. The outputs of the signal and LO (201 and 202) are fully spatial overlapped or they are totally mixed at the output ports. However, the phase shifts of the outputs are different to ensure orthogonality between them. Given the input signals, the layout of the corresponding outputs determines the required number of phase masks and performance of the MDH.

In contrast, waveguide based optical 90-degree hybrids don't work well for all modes simultaneously. This is because different modes have different effective indices, resulting in different splitting ratios and different interferometric phase offsets. Even if the hybrid worked well, extra mode demultiplexers with four outputs for each mode are required.

Since the outputs of an MDH are in a plane, they can be detected by directly shining photodetectors in a two-dimensional array without coupling into fiber. With properly designed parameters, output spots match the photodetector array in term of pitch and mode field diameter that simplifies the coupling significantly. Besides, the photodetector pitch in two-dimensional arrays is as small as ten microns, allowing for small spot spacing, making the MDH compact.

Figure 3A:
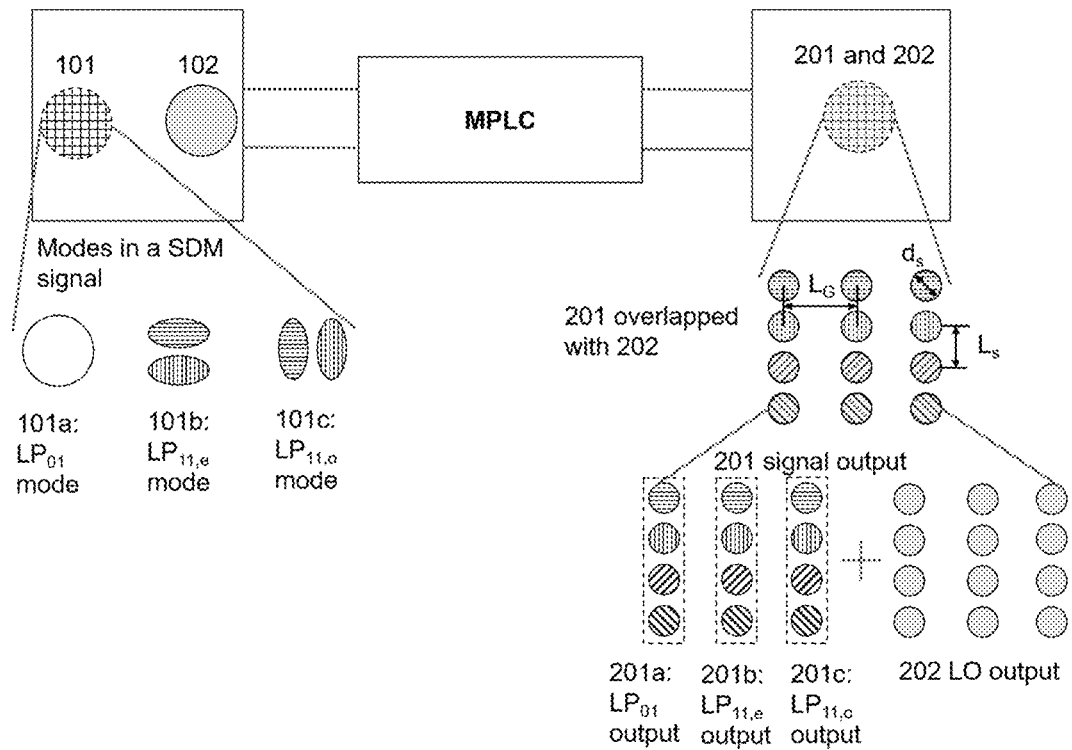
FIGS. 3(a, b) schematically illustrates an exemplary, non-limiting MHD based on MPLC for extracting the amplitudes and phases of all modes in a space-division multiplexing (SDM) signal.

FIG. 3a schematically illustrates an exemplary, non-limiting MDH 300 based on MPLC for extracting the amplitudes and phases of all modes in a space-division multiplexing (SDM) signal. The input SDM signal consists of three linearly-polarized (LP) modes, i.e., $LP_{01}$, $LP_{11,e}$ and $LP_{11,o}$, as shown in FIG. 1(d) (not limited to three; could be an arbitrary integer number). The orientation angle of filled lines represents different phase shifts of modal electric field. Here horizontal lines denote 0 phase shift and vertical lines denote π-phase shift. The three modes occupy the same area in the entrance plane marked by 101. The outputs of each LP mode are four spots in a column with different phase shifts, 0, π, π/2 and −π/2, denoted by horizontal, vertical, upward diagonal, and downward diagonal lines occupying different positions in the exit plane. The LO is split and projected onto 12 in-phase spots. Four phase plates with 201×201 pixels each were used in our simulations. The input $LP_{01}$ mode with mode-field diameter of 57 μm propagates 3 cm in free space and arrives at the first phase plate with mode-field diameter expanded to 266 μm. The mode-field diameters ($d_s$) of the output spots are all the 33.7 μm; the distance between adjacent spots ($L_s$ and $L_G$) is 306 μm. The pixel size for the phase plates is 6.8 μm. All beams are normal to the phase plates to maintain the paraxial condition. We used a reported wavefront-matching algorithm to solve for the desired phase pattern of each phase plate, which updates the phase pattern by evaluation the overlap between the forward and backward propagating field at the target plate iteratively until a stable result is reached. The unitary transform for free-space propagation between successive phase plates is modeled as Fresnel diffraction, in which the quadratic wavefront distortion in the transverse direction is considered.

Figure 3B:
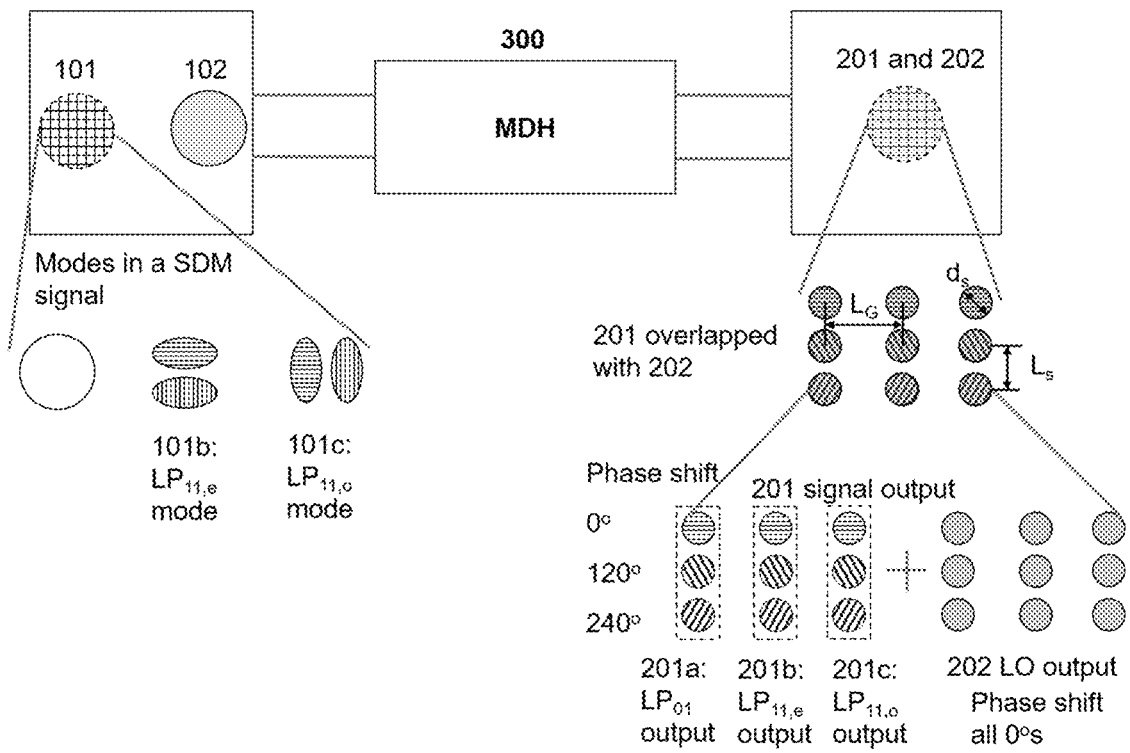

FIG. 3b schematically illustrates a variation of the same example as shown in FIG. 3a but with different output layout. The outputs of each LP mode are three spots in a column with different phase shifts, 0, 3π/3 and −2π/3, denoted by horizontal, downward diagonal, and upward diagonal filled lines occupying different positions in the exit plane. The LO is split and projected onto 9 in-phase spots.

Figure 4:
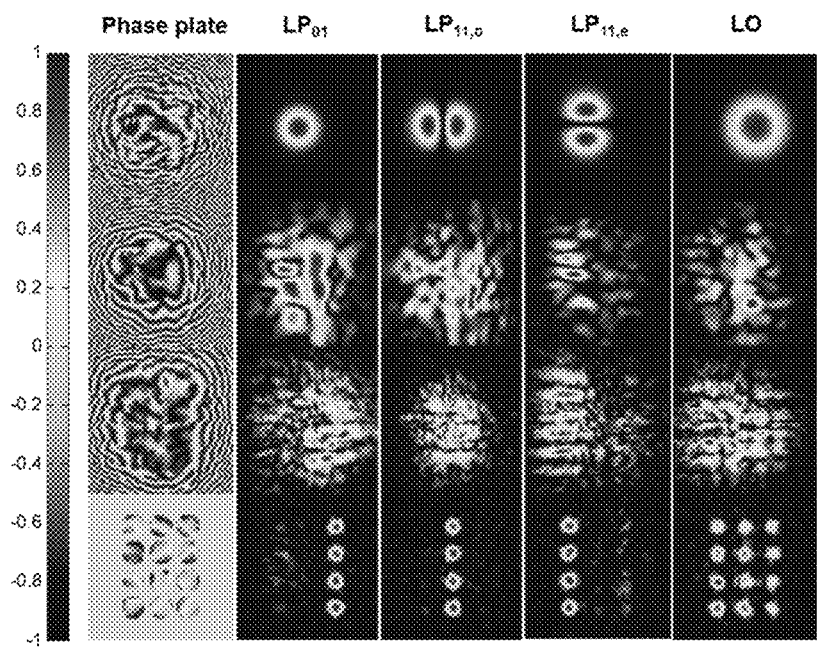
FIG. 4 shows the profiles of four designed phase plates and the beam intensity profiles right after each phase plate, according to an illustrative embodiment.

FIG. 4 shows the profiles of the designed four phase plates and the beam intensity profiles right after each phase plate. Four phase plates are sufficient to convert the three modes to the desired profiles at the designated positions effectively, though a small portion of the input power is lost in the form of stray light.

Figure 5:
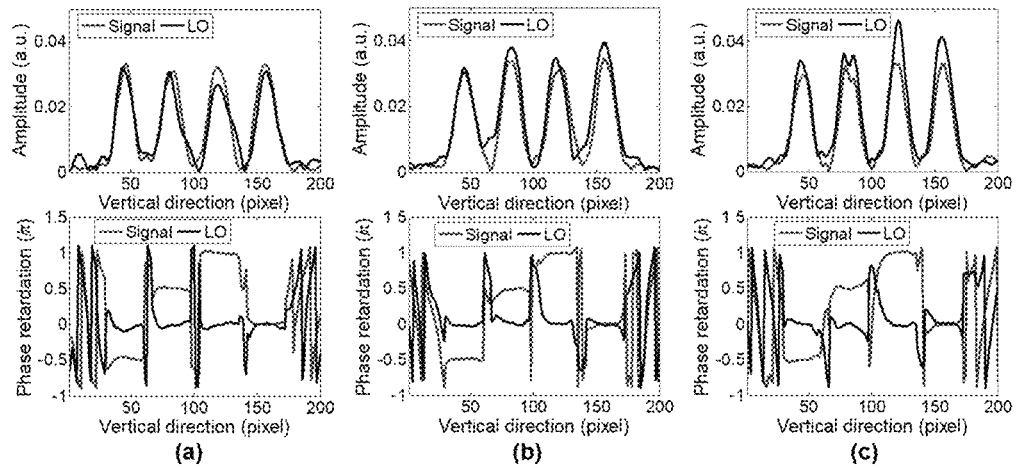
FIGS. 5(a,b,c) plot the amplitude and phase retardation of the output beam along the mirror symmetric line for a) the $LP_{01}$ mode, b) the $LP_{11o}$ mode, and c) the $LP_{11e}$ mode.

To observe the results more intuitively, the amplitudes and phases of the four output spots for the signal and LO along the center line are plotted in FIGS. 5(a,b,c). The total output power of the four spots is normalized. The LO and signal fields are well-aligned. The phase retardations of the four output spots of the signal almost follow what was desired except for some minor ripples. The unequal amplitudes of the four spots indicate that the input power is not equally divided due to a finite number of phase plates used. Increasing the number of phase plates can reduce this ripple.

Table 2 lists the performance metrics of the exemplary MDH described above. The performance metrics are calculated from the output spots by using the expressions in FIG. 14. The performances are comparable with those of reported commercial single-mode 90-degree hybrids.

TABLE 2

Performance Metrics of Mode De-Multiplexer and Optical 90-Degreee Hybrid

| Mode | $LP_{01}$ | $LP_{11o}$ | $LP_{11e}$ | LO | Products |
|---|---|---|---|---|---|
| IL (dB) | −1.17 | −1.02 | −1.22 | −0.76 | −1.5~−1.0 |
| Xtalk (dB) | −14.74 | −13.95 | −15.89 | −13.03 | — |
| $\Delta IL_k$ (dB) | 0.75 | 0.74 | 1.33 | 2.62 | 0.5~2.0 |
| $\Delta\theta_k$ (deg) | 1.31 | −0.03 | 0.49 | 2.89 | 5 |
| Actual (dB) | 0.50 | 0.15 | 0.49 | — | 0.2~1.0 |
| Δφ (deg) | −5.86 | 4.56 | −2.21 | — | — |

Increasing the number of phase plate can improve the performance.

Figure 6A:
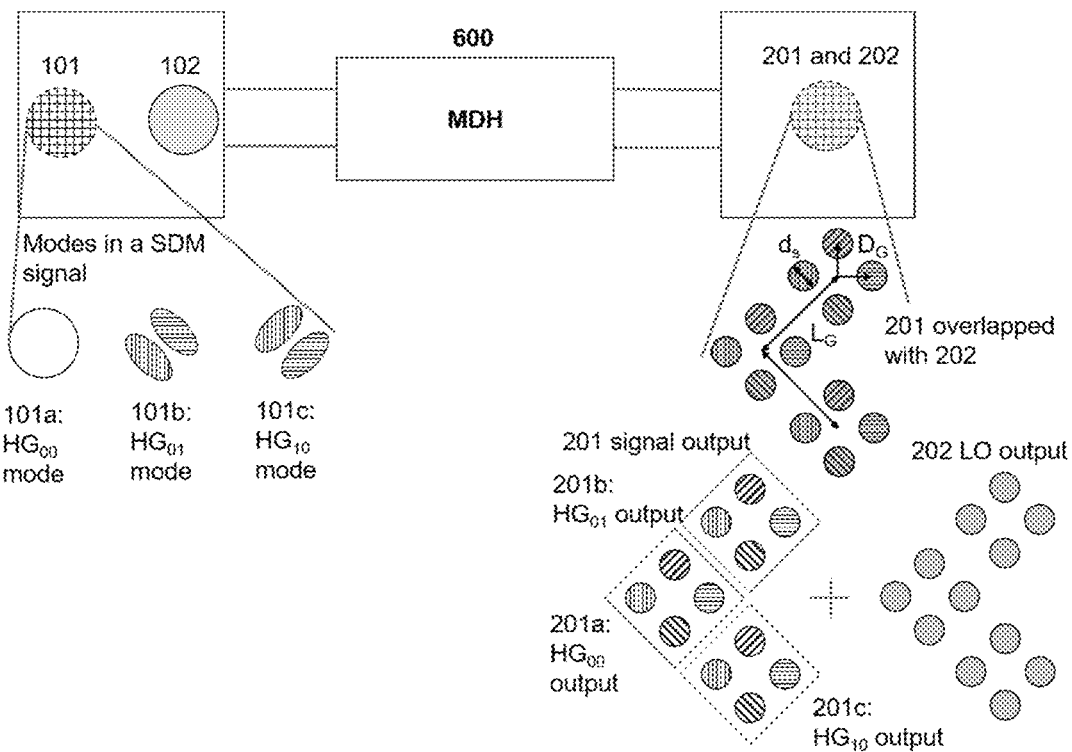
FIG. 6(a,b) schematically illustrate a MDH based on MPLC for extracting the amplitudes and phases of all Hermite Gaussian (HG) modes in a space-division multiplexing (SDM) signal.

FIG. 6a schematically illustrate a MDH 600 based on MPLC for extracting the amplitudes and phases of all Hermite Gaussian (HG) modes in a space-division multiplexing (SDM) signal. The input SDM signal consists of three Hermite Gaussian (HG) modes, i.e., $HG_{00}$, $HG_{01}$, and $HG_{10}$ (but not limited to three, could be an arbitrary integer number). The horizontal lines denote 0 phase shift and vertical lines denote π phase shift. The three modes occupy the same area in the entrance plane marked by 101. The outputs of each HG mode are four spots in a square shown in the insets. Grouped four spots for all HG modes are arranged in an isosceles right triangular array, where the $HG_{00}$ mode output locates at the right angle vertex and the modes in the same mode group locate in the long edge of the triangle. The group center spacing is $L_G$ and the diameter of group is $D_G$. The spot mode field diameter is $d_s$. These parameters constrained by output coupling conditions, are optimized in iterative calculation of phase masks. The positions of the grouped spots are chosen so that the four spots at the output plane are at the same location as the outermost lobe of the corresponding HG mode at the input plane. Such an arrangement can reduce the number of phase masks in the MDH without sacrificing the performance, because the input HG modes and the output spot array share identical separability and structural symmetry. The output of the LO is multiple spots that fully overlap the output spots of all modes. The spot pair-wise phase difference between each mode and the LO outputs are 0, π, π/2 and −π/2, respectively.

Figure 6B:
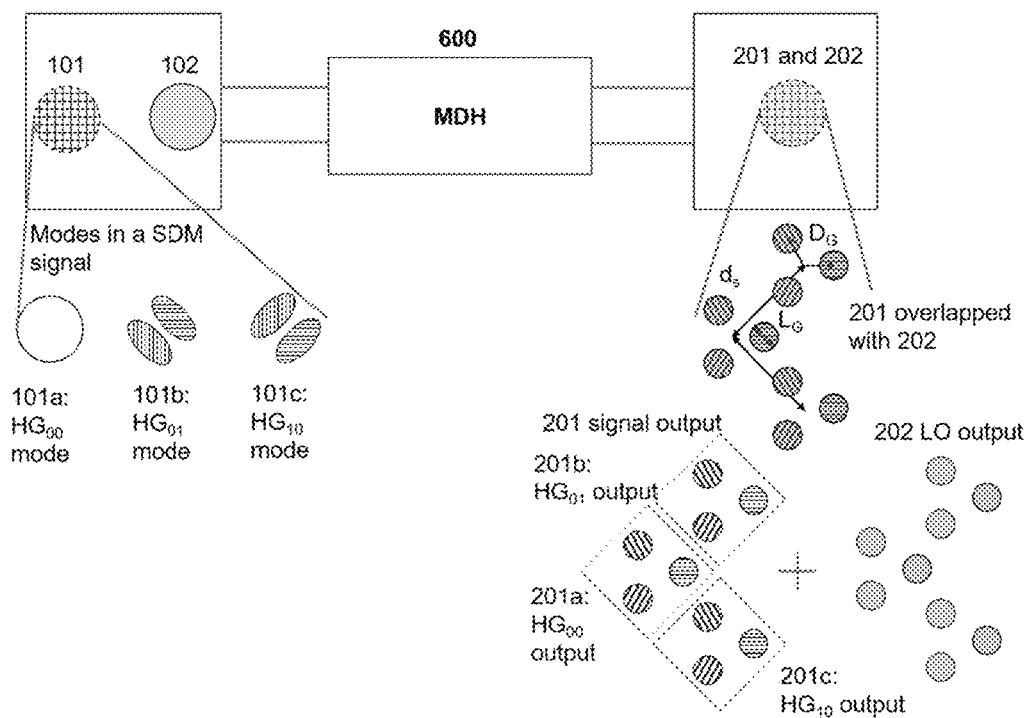

FIG. 6b schematically illustrates a variation of the same exemplary as shown in FIG. 6a but with different output layout. The outputs of each LP mode are three spots in a column with different phase shifts, 0, 3π/3 and π2π/3, denoted by horizontal, downward diagonal, and upward diagonal filled lines occupying different positions in the exit plane. The LO is split and projected onto 9 in-phase spots.

Figure 7:
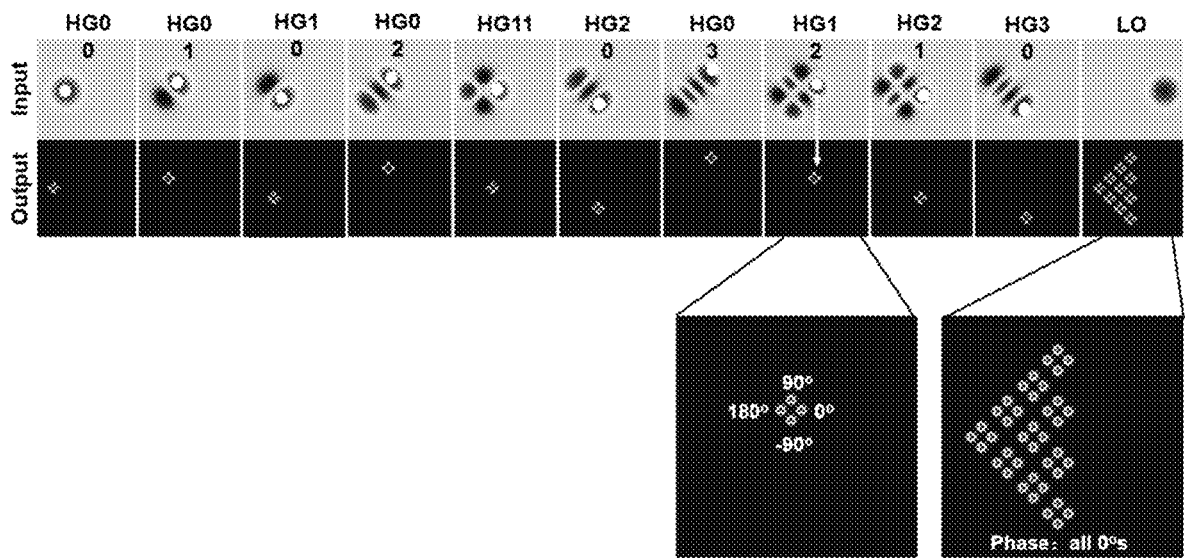
FIG. 7 illustrates the layout for the input HG modes and LO at the entrance plane (the first phase mask) and the corresponding output at the exit plane (the last phase mask) of an exemplary ten mode MDH.

FIG. 7 illustrates the layout for the input HG modes and LO at the entrance plane (the first phase mask) and the corresponding output at the exit plane (the last phase mask) of an exemplary ten mode MDH. All the HG modes are incident on the same position at the entrance plane. To show each mode clearly, the normalized mode fields are shown separately in the upper panel. Each mode is mapped onto four spots with the same Gaussian intensity profile at the output, as shown in the bottom panel. The four spots have a phase shift of 0, 90, 180 and −90 degrees, respectively. The four spot groups act as elements of an array with an isosceles right triangle geometry. The positions of the grouped spots are chosen so that the four spots at the output plane are at the same location as the outermost lobe of the corresponding HG mode at the input plane, marked with a white dot. Since the outermost lobes of different modes are not fully spatially overlapped, they uniquely represent the corresponding HG mode. The properties shared by the input HG modes and the output spot array, such as separability between the x- and y-direction and the geometric symmetry, are responsible for the significant reduction in the number of phase masks. In our simulation, the beam waists of the input HG modes, LO, and output spots were 372.5 μm, 372.5 μm, and 17.6 μm, respectively; the center-to-center distance between the HG modes and the LO at the entrance plane ($L_{in}$) was 1418.7 μm; the center-to-center distance between two neighboring spots ($L_s$) and spot groups ($L_G$) on the exit plane were 52.7 μm and 186.3 μm, respectively. The pixel size was 4.37 μm and the phase masks were 1024×1024 pixels.

Figure 8A:
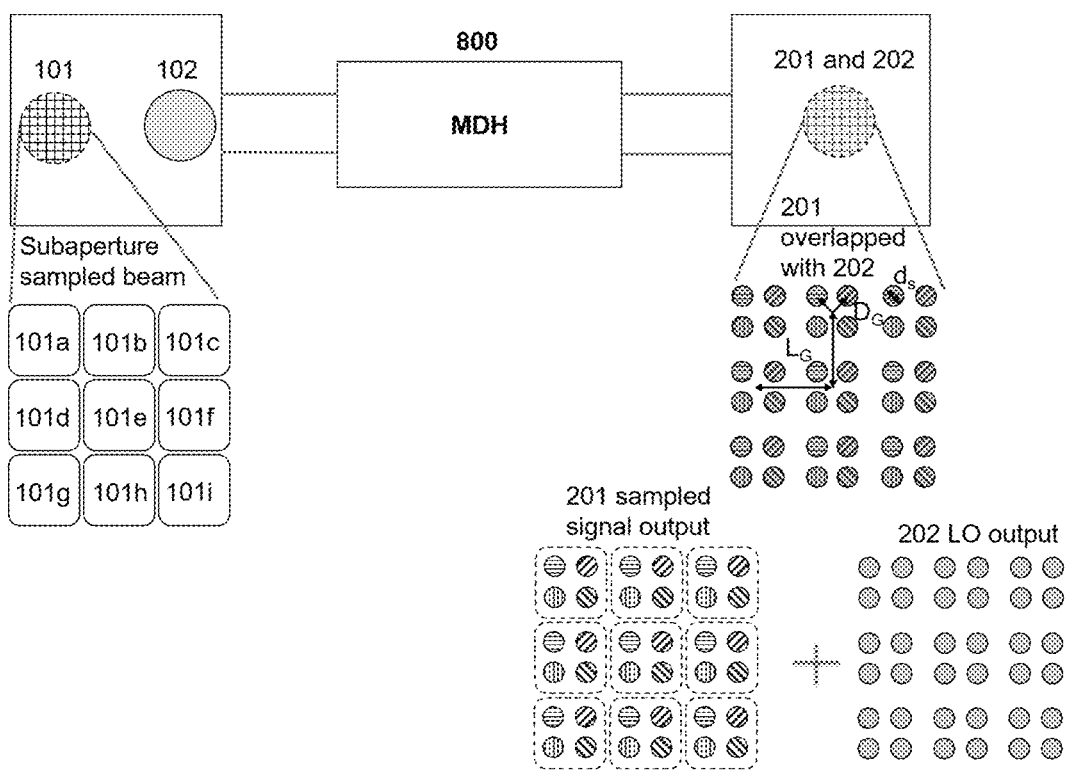
FIG. 8(a,b) schematically illustrate a MDH based on MPLC for extracting the amplitudes and phases profile of a large beam by partitioning the beam with subapertures.

FIG. 8a schematically illustrate a MDH 800 based on MPLC for extracting the amplitudes and phases profile of a large beam by partitioning the beam with subapertures. The input beam is sampled by nine non-overlapped subapertures. The nine subapertures cover a large square except for the boundary of neighboring subapertures. The subaperture could be an arbitrary shape, such as a circle, a triangle, a square, a hexagon, etc. A rounded square is illustrated. The input beam is assumed a plane wave. The number of subapertures can be an arbitrary number. The actual input beam can have arbitrary shape. Basically, the output is the actual input beam difference from the plane wave. The outputs of each sampled beam are four spots in a square shown in the insets. The four output spots are arranged in a small square that are covered by the projection of the corresponding subaperture from the entrance plane to the exit plane along propagation direction. This arrangement can greatly reduce the number of phase masks in the MDH without sacrificing the performance. More specifically, the required number of phase masks is almost independent of the number sub-apertures (from a few to hundreds). This is because there is no cross overlap between the subapertures at the entrance plane as well as their corresponding output at the exit plane. In this layout, the desired phase patterns for each subaperture is independent of others as if other subapertures don't exit, because they occupy different areas on the phase masks. Adding more subapertures only requires enlarging the area of phase masks to accommodate the phase patterns for the added subapertures. That is why the design makes the required number of phase masks almost independent of subaperture count. The output of the LO is multiple spots that fully overlap the output spots of all modes. The spot pair-wise phase difference between each mode and the LO outputs are 0, π, π/2 and −π/2, respectively.

Figure 8B:
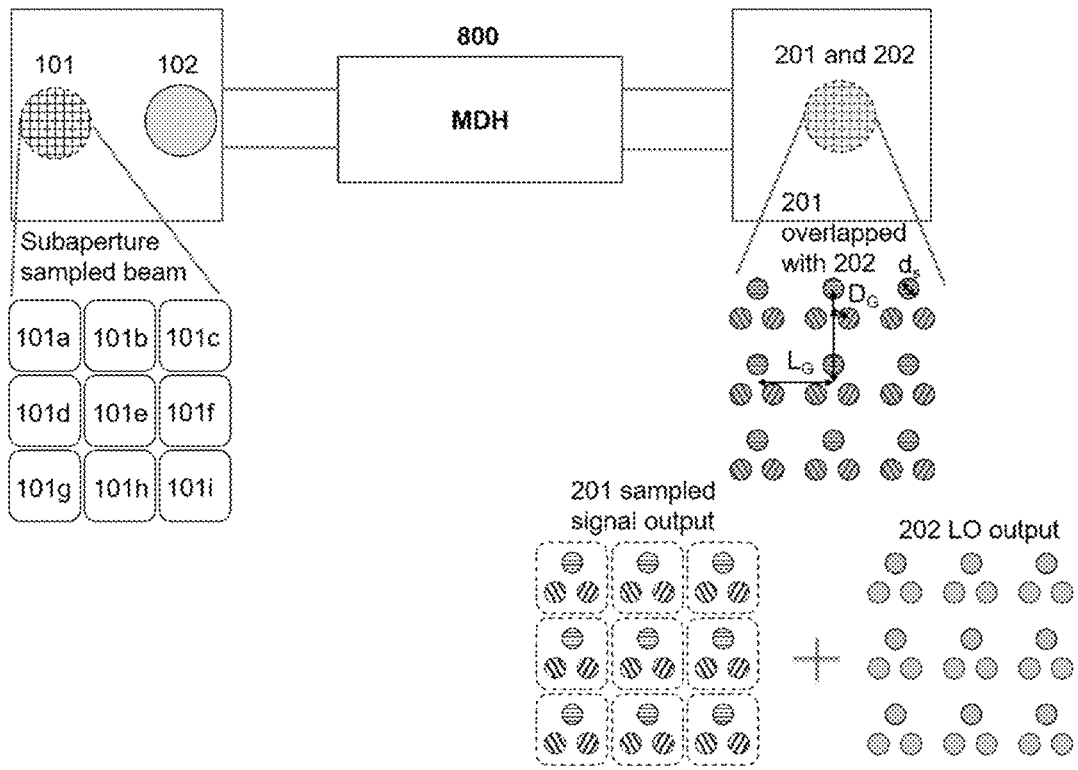

FIG. 8b schematically illustrates a variation of the same exemplary as shown in FIG. 8a but with different output layout. The outputs of each LP mode are three spots in a column with different phase shifts, 0, 3π/3 and −2π/3, denoted by horizontal, downward diagonal, and upward diagonal filled lines occupying different positions in the exit plane. The LO is split and projected onto 27 in-phase spots.

It is easy to use this MDH for wavefront sensing in various configurations. The entrance pupil could be lens array, single lens or an aperture as mentioned before. The MDH is placed at the back focal plane of the lens/lens array. In the exit pupil plane, one can detect the outputs either with a balanced photodetector array or simply with a camera to directly capture the image and retrieve the amplitude and phase information via image processing. Compared with the digital hologram (DH) detection where an incident LO overlaps the signal on a camera with an tilted angle, the former can work at a high speed determined only by the photodetector response time and the latter requires a much simpler processing algorithm (no two-dimensional FFT, filtering and IFFT).

Figure 9:
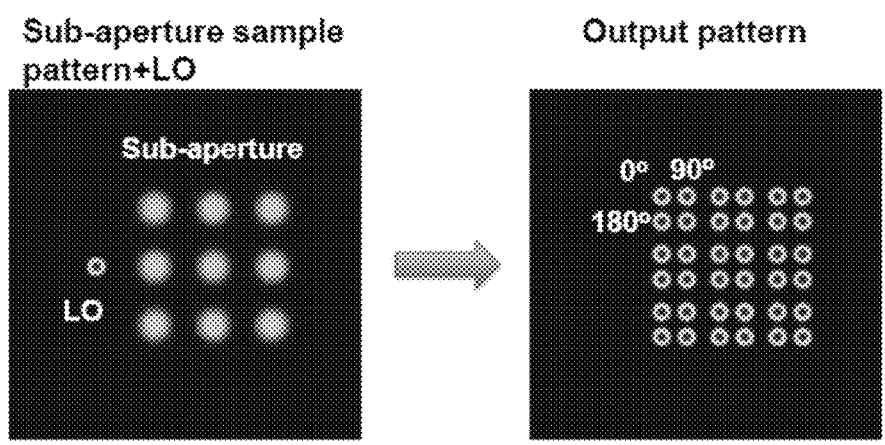
FIG. 9 illustrates input to output mapping for an exemplary optical 90-degree hybrid for a nine subaperture-based MPLC device.

FIG. 9 illustrates the arrangement of the input and output beam spots for an optical 90-degree hybrid for nine (9) subapertures. The output four spots for each subaperture are arranged in a small square that can be covered by the corresponding subaperture. The nine large spots representing the nine subapertures are arranged in a square to cover an incoming beam, which is assumed to be much larger than the LO beam spot. The four output spots for each subaperture are arranged in a small square that are covered by the projection of the corresponding subaperture from the entrance plane to the exit plane along propagation direction. This arrangement ensures each subaperture only sampled by the four output spots, leading to high conversion efficiency.

Figure 10:
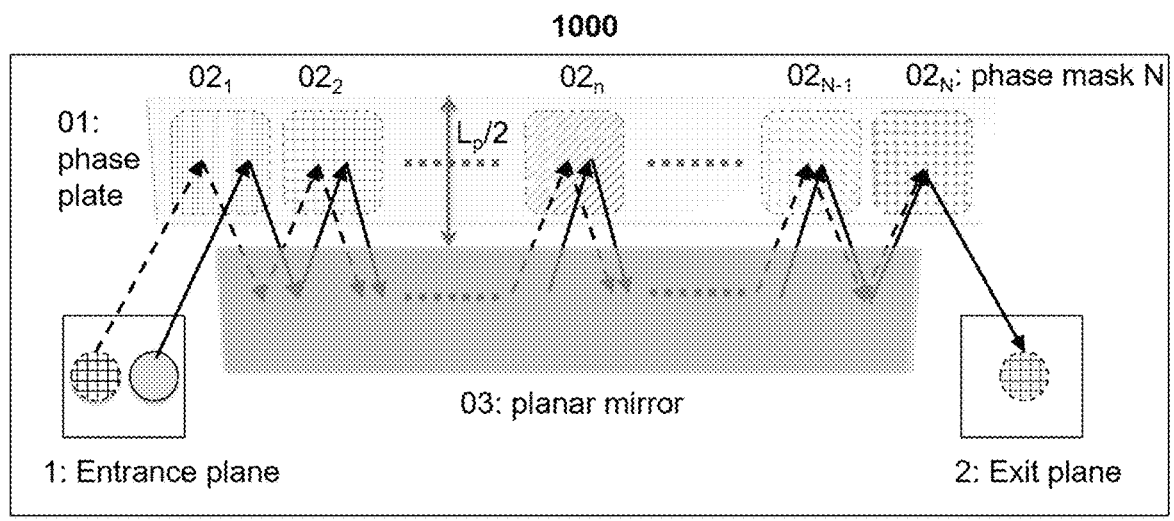
FIG. 10 schematically shows an exemplary multi-pass reflective cavity structure for a MDH based on MPLC.

FIG. 10 schematically shows a multi-pass reflective cavity structure 1000 for a MDH. We use a reflective cavity MPLC to realize the MDH, which consists of a planar phase plate 01 and mirror 03 spaced by distance of $L_p/2$. The planar phase plate 02 comprises N sections with different phase patterns $02_1$ to $02_N$, each of which acts as one phase mask. In the MDH, the input signals and the LO having specified profiles and positions in the entrance plane 1 are incident on the first phase mask $02_1$, where they are reflected with the wavefront modulated by the phase pattern (thickness variation of the phase plate as a spatial position function). The light then bounces between the mirror 03 and the phase plate 01 N-1 more times, each time hitting a different phase mask. At the exit plane, the light has finally evolved into the desired output profiles. Beam manipulation was accomplished via wavefront modulation using phase masks and diffraction during beam propagation. Note the entrance plane and exit plane can overlap with the first and last phase mask.

Figure 11:
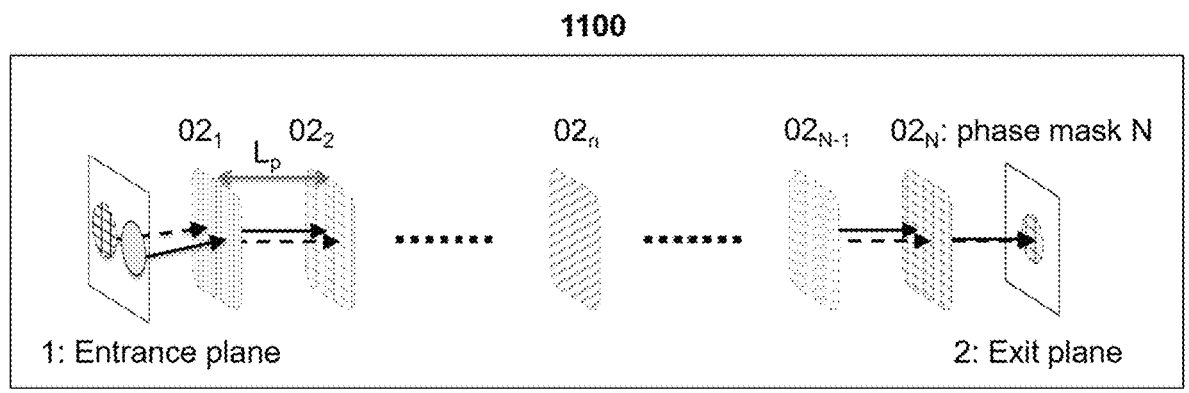
FIG. 11 schematically shows an exemplary transmissive structure for a MDH based on MPLC.

FIG. 11 schematically shows an exemplary transmissive structure 1100 for a MDH based on MPLC. We use a transmissive MPLC to realize the MDH, which consists of N planar phase masks with different phase patterns $02_1$ to $02_N$. The spacing between adjacent phase masks is $L_p$. In the MDH, the input signals and the LO having specified profiles and positions in the entrance plane 1 go through the phase masks from $02_1$ to $02_N$ and experience spatial phase shifts induced by the phase pattern on phase masks. At the exit plane, the light has finally evolved into the desired output profiles. Beam manipulation was accomplished via wavefront modulation using phase masks and diffraction during beam propagation. Note the entrance plane and exit plane can overlap with the first and last phase mask. Reflective cavity MDHs are easy for fabrication and assembly, but the loss increases rapidly with the number of phase masks increasing. In addition, the phase mask width is narrow to allow small incident angle of input beam. Large incident angle makes the MDH more sensitive to polarization state (called polarization dependent loss PDL) which is unwanted in real application. Transmissive MDHs, in contrast, have lower loss and allow large phase masks without inclined incident, never suffering from PDL, but at the expense of difficulty in both fabrication and assembly.

Figure 12:
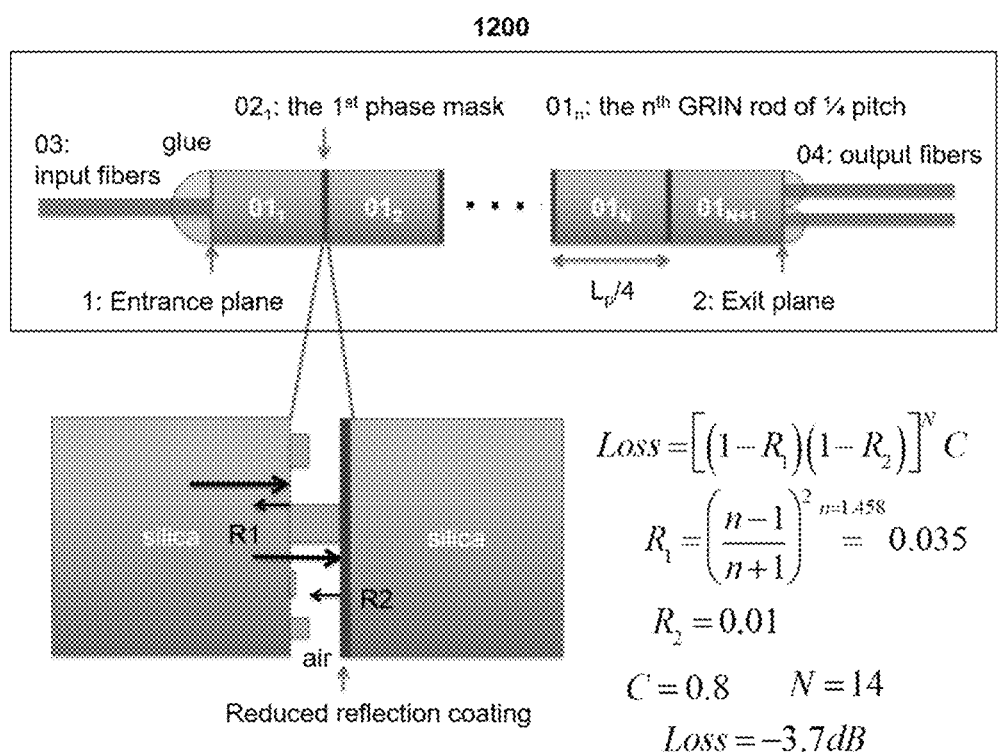
FIG. 12 schematically shows an exemplary transmissive structure for a MDH using GRIN rods.

FIG. 12 schematically shows an exemplary transmissive structure 1200 for a MDH using GRIN rods. The GRIN rods ($01_{1-N}$) play a role as optical Fourier Transform and phase masks substrate. The N planar phase masks with different phase patterns $02_1$ to $02_N$ are fabricated at one end of the GRIN rods ($01_{1-N}$). The refractive index of the GRIN rods is high in the rod center and gradually decreases along the radial direction to the lowest at the edge in a quadratic law.

The light propagating inside the GRIN is well confined and experiences optical Fourier Transform after propagation a quarter pitch ($L_p/4$) of the GRIN rods. To achieve low transmission loss, an anti-reflection film is coated at the end of GRIN against the phase mask. Input and output fibers (03 and 04) can be attached to the two ends (entrance and exit plane 1 and 2) by gluing. In the MDH, the input signals and LO having specified profiles and positions in the entrance plane 1 go through the phase masks from $02_1$ to $02_N$ and experience spatial phase shifts induced by the phase patterns on the phase masks. At the exit plane, the light has finally evolved into the desired output profiles. Beam manipulation was accomplished via wavefront modulation using phase masks and diffraction during beam propagation. Transmissive MDHs, in contrast, have lower loss and allow large phase masks without inclined incident, never suffering from PDL, but at the expense of difficulty in both fabrication and assembly.

Figure 13:
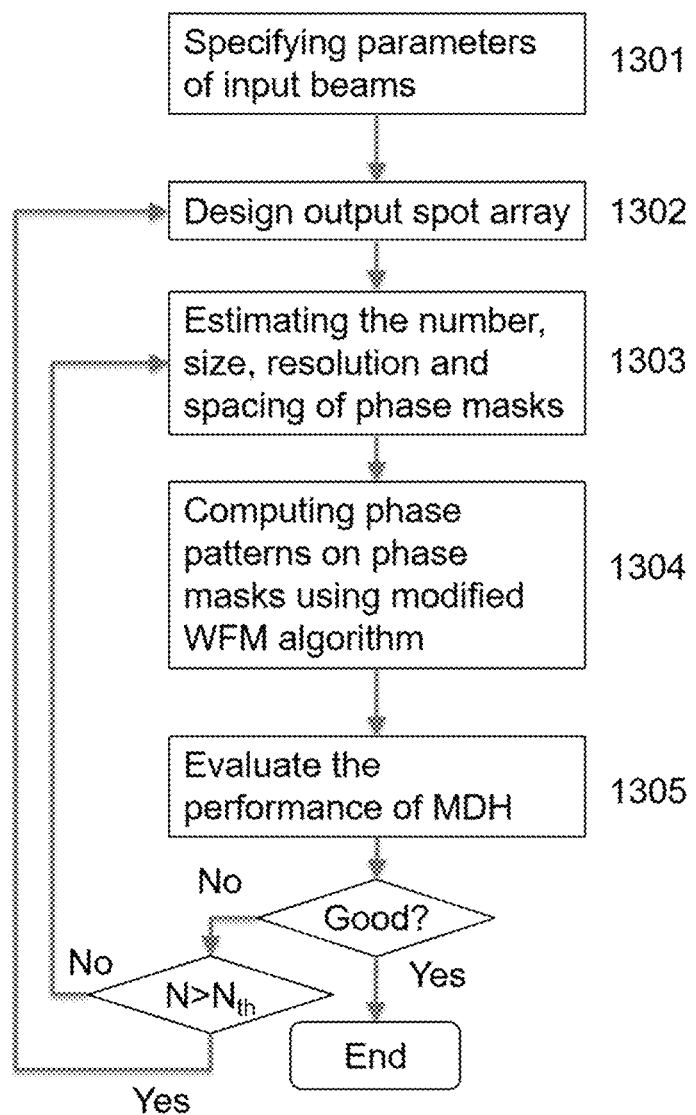
FIG. 13 is a block flow chart diagram illustrating the design steps for an exemplary MDH.

FIG. 13 illustrates the design steps for an exemplary MDH. At 1301, parameters of the input are chosen, such as beam sizes ($D_{sig}$, $D_{LO}$), positions of signals and LO ($L_{in}$), size and resolution of the entrance plane. At 1302, the output spot array is identified. The arrangement and shape of the output spot array depends on the spatial structure of the input signals to reduce the number of phase masks. The spots size and spacing ($d_s$, $L_G$, $D_G$, $L_s$) are determined by the output power coupling and detection requirements. At 1303, the number, size, resolution and spacing of phase masks are estimated. These parameters are determined in iterative performance evaluations. A tradeoff between performance and cost may be decided. At 1304, the phase patterns on the phase masks are computed using a modified WFM algorithm. Improving the wavefront match between the forward and backward propagating beams is achieved by introducing the spatial phase modulation specified by the mismatch. Phase smoothing techniques are used to remove high-frequency variation to improve MDH bandwidth and tolerance to fabrication error. At 1305, the performance of the MDH is evaluated from the output spots (refer also to FIG. 14 showing particular performance evaluation parameters). If the performance is satisfactory, then the process is ended. If the performance is not satisfactory, then iterate N times where $N_{th}$ is a threshold value. If $N \leq N_{th}$, then proceed to step 1303; if $N > N_{th}$, then proceed to step 1302.

Figure 15:
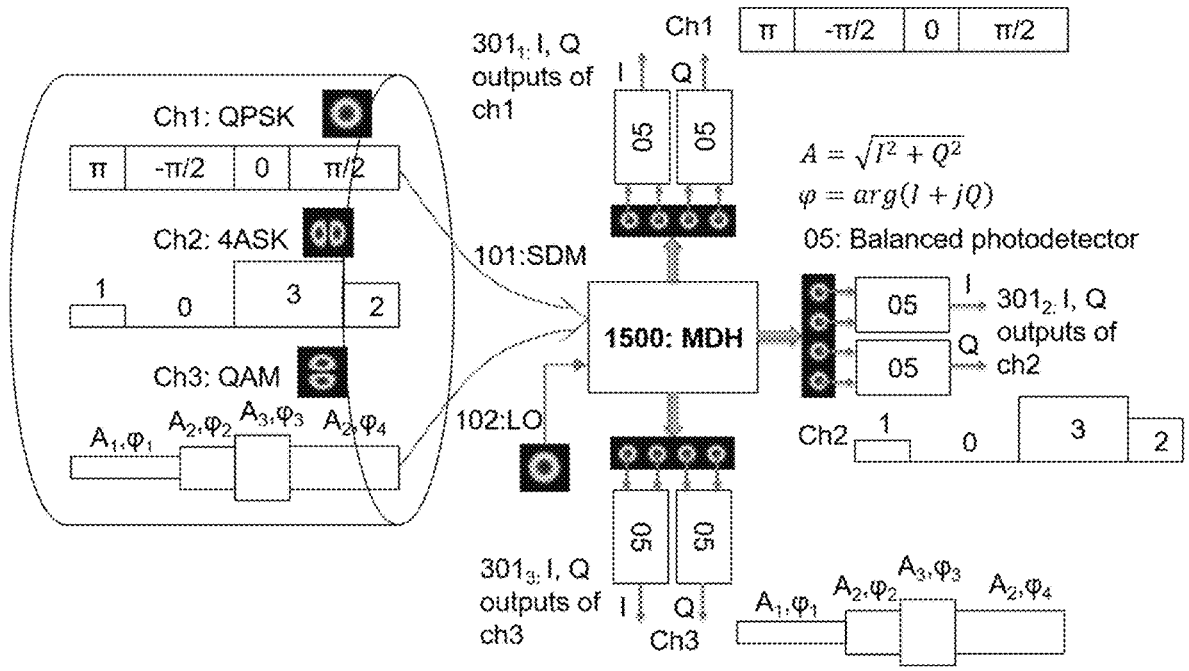
FIG. 15 schematically illustrates how an exemplary MDH is used in a space-division multiplexing (SDM) optical transmission system to simplify a conventional SDM receiver.

FIG. 15 shows how an exemplary MDH (1500) is used in a space-division multiplexing (SDM) optical transmission system to simplify a conventional SDM receiver (see also FIG. 16) structure by replacing a mode demultiplexer, LO power divider, and N optical hybrids. There are three channels carrying different modulation formats over three spatial modes, such as quadrature phase shifted keying (QPSK) for ch1 over $LP_{01}$ mode, 4-level amplitude shifted keying (4ASK) for ch2 over $LP_{11,o}$ mode and quadrature amplitude modulation (QAM) for ch3 over $LP_{11,e}$ mode. These three modes are spatially multiplexed as a SDM signal carrying dependent information transmitted to a SDM receiver consisting of a MDH (0) and balanced photodetector (05) arrays. The SDM is demultiplexed by the MDH and mixed with an LO. With designed position and profile at the entrance plane, the output is three groups of four spots at the exit plane, denoting the in-phase (I) and quadrature (Q) components (301) of each mode. Balanced photodetectors (05) are used to extract the I and Q components by suppressing DC offset and common mode noise. The amplitude and phase of modulation format can be reconstructed by using the I and Q components, so the transmitted information is retrieved.

Figure 16:
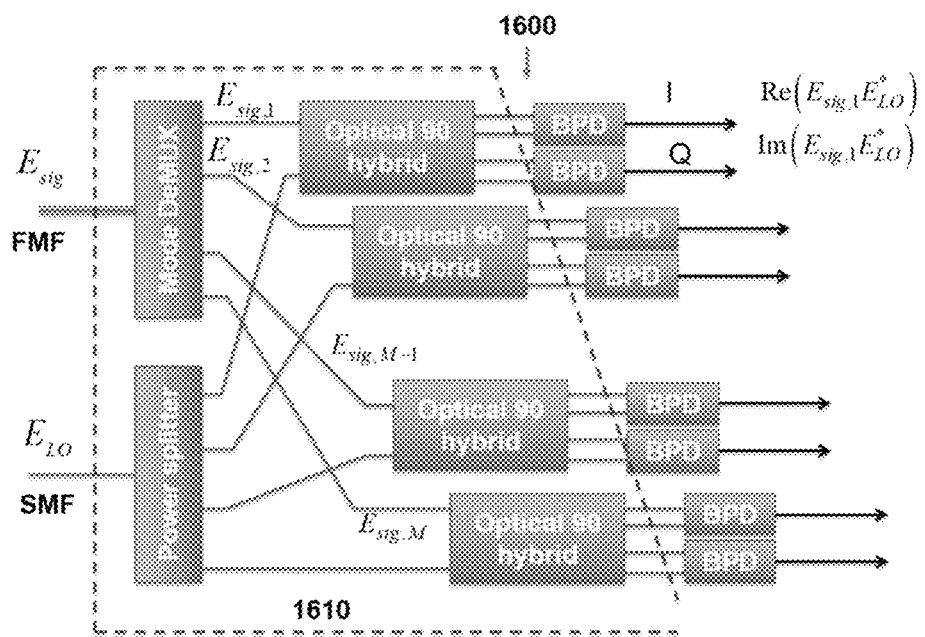
FIG. 16 schematically shows a SDM optical coherent receiver and the optical front-end that can be replaced by an embodied MDH.

FIG. 16 schematically shows a SDM optical coherent receiver 1600 and the optical front-end 1610 that can be replaced by an embodied MDH. A conventional SDM receiver includes M optical 90-degree hybrids, where M is the number of modes required to interconnect with a mode demultiplexer and a 1:M power divider, marked by a trapezoid with dashed lines, that can be replace by an embodied MDH resulting in a simplified structure, especially for a large M.

Figure 17:
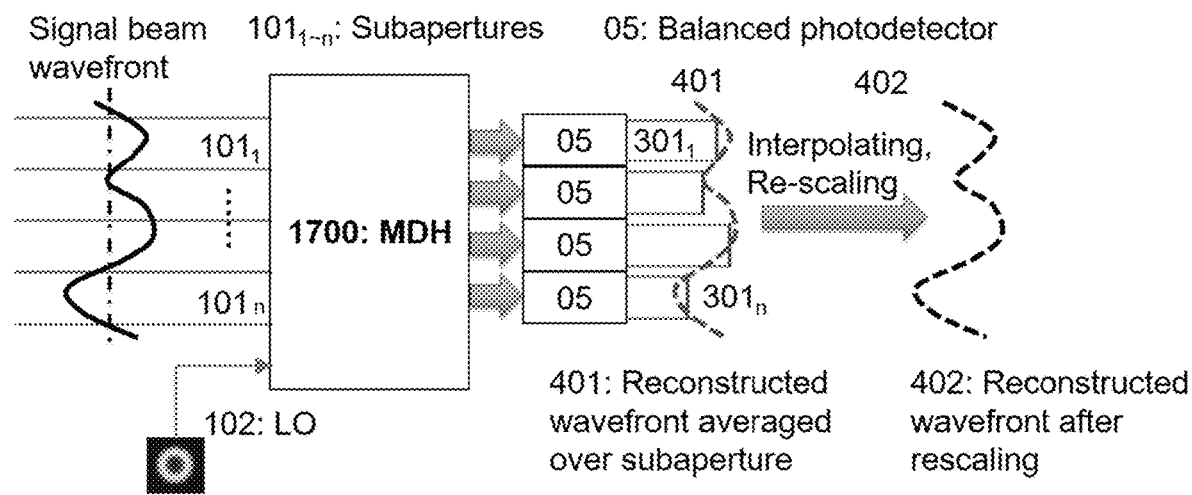
FIG. 17 schematically shows how an exemplary MDH can be used in wavefront sensing to acquire an incident beam amplitude and phase over subapertures by coherent detecting the sub-aperture partitioned beam.

FIG. 17 schematically shows how an exemplary MDH (1700) can be used in wavefront sensing to acquire an incident beam amplitude and phase over subapertures by coherent detecting the sub-aperture partitioned beam. An incident beam with spatial-varying amplitude and phase is sampled by subapertures in an MDH (0). The dash-dotted line represents the undistorted wavefront (plane wave) or the wavefront of the LO (102). The deviation of the incident beam wavefront from the LO wavefront is mapped as the in-phase and quadrature components (301) in the output of each subaperture through MDH conversion and balanced photodetector (05) detection. The amplitude and phase relative to the LO of the subapertured sampled beam can be reconstructed by using the I and Q components, so the incident wavefront deviation from the LO wavefront is retrieved through further signal processing, such as interpolating and re-scaling.

The MDH apparatus and methods can also be adapted for other spectral regions than those described herein above, and are not limited to the near infra-red. More specifically, for appropriate materials transparent at the target spectrum, by using the same structure with rescaled size parameters, such as incident beam size ($D_{sig}$), pixel size of phase masks ($\delta$), and phase mask spacings ($L_p$), an MDH working at the target spectrum can be generated.

The underlying principle for this treatment is that the behavior of beam diffraction utilized by MDH is governed by the angular spectrum characterized by a characteristic parameter $D_{sig}*\delta/(L_p*\lambda)$. If the incident beam wavelength ($\lambda$) is changed, other parameters should be adjusted to keep the characteristic parameter as a constant.

Figure 18:
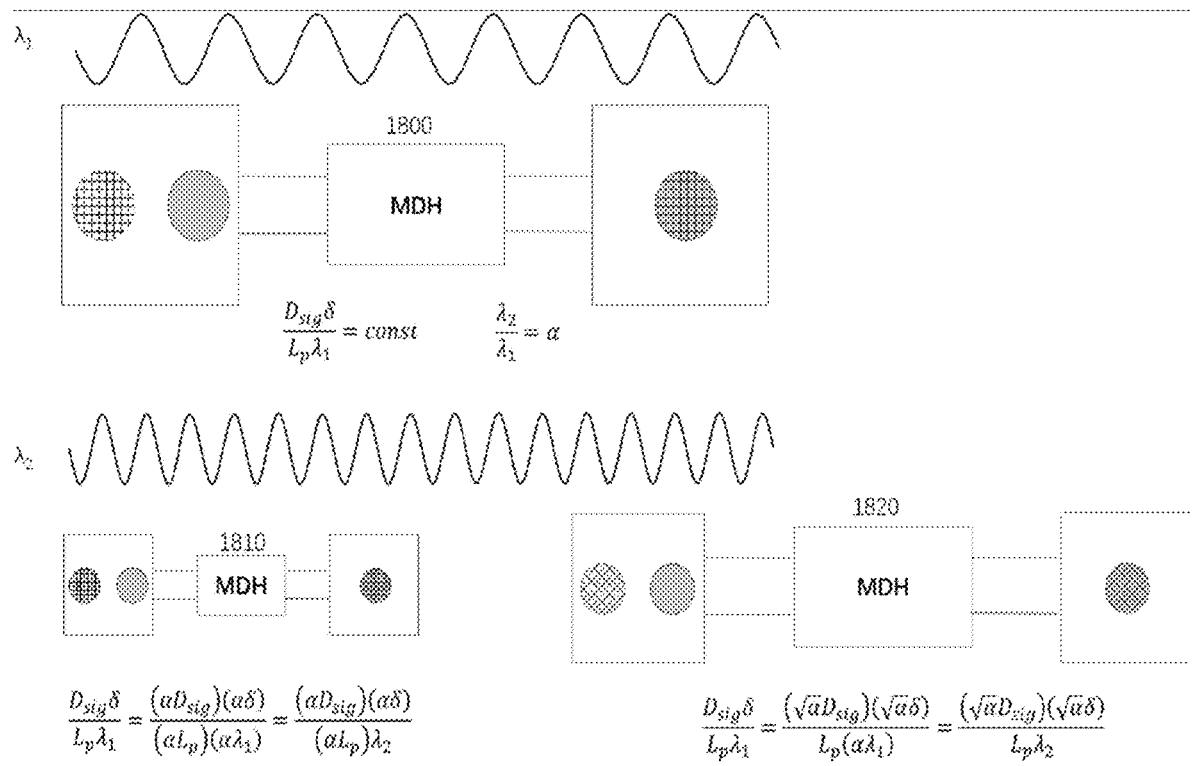
FIG. 18 is a pictorial illustration of scaling the embodied invention to other spectral regions.

FIG. 18 illustrates two exemplary parameter adjustment schemes to adapt to wavelength change. The first one involves rescaling all size parameters with a scaling factor as the wavelength ratio, i.e., reducing $D_{sig}$, $\delta$, and $L_p$ for shorter wavelengths. The second one involves rescaling $D_{sig}$ and $\delta$ but keeping $L_p$ unchanged. It is easy to adapt to 2~3 orders of magnitude change of wavelength by using the second scheme ranging from Terahertz, thermal IR, infra-red, and visible light to ultraviolet.

Notwithstanding that the numerical ranges and parameters setting forth the broad scope of the disclosed embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While various disclosed embodiments have been described above, it should be understood that they have been presented by way of example only and not as a limitation. Numerous changes to the disclosed embodiments can be made in accordance with the specification herein without departing from the spirit or scope of this specification. Thus, the breadth and scope of this specification should not be limited by any of the above-described embodiments; rather, the scope of this specification should be defined in accordance with the appended claims and their equivalents.

We claim:

1. A mode demultiplexing hybrid (MDH) apparatus, comprising:
   an entrance plane adapted to receive inputs including a mode-multiplexed signal having M greater than 1 number of spatial modes and a single-mode reference, wherein the signal and reference inputs are spatially separated, occupy non-overlapped areas, and can coherently interfere;
   a multi-plane light converter (MPLC) having an input optically coupled to the signal and reference inputs, and a series of phase plates separated by free space propagation paths; and
   an exit plane optically coupled to an output of the MPLC, wherein exit plane of the MDH contains spatially non-overlapping interferences between every mode of the input signal and a common reference with 0, 90, 180, and 270 degree relative phase shifts.

2. The MDH of claim 1, wherein the input signal is at least one of spatially multiplexed, multiple orthogonal spatial modes including linearly-polarized (LP) modes, Hermite Gaussian (HG) modes, or Laguerre Gaussian (LG) modes and one beam divided into multiple non-overlapped, sub-apertured segments.

3. The MDH of claim 1, wherein the input reference is a local oscillator (LO).

4. The MDH of claim 1, wherein the MPLC is a reflective cavity MPLC including a planar phase plate having N sections with different phase patterns, each of which acts as one phase mask, and a planar mirror, separated by free space.

5. The MDH of claim 4, wherein at least one of the entrance plane and the exit plane overlap with the first and last phase mask, respectively.

6. The MDH of claim 2, wherein the input signal is comprised of spatially overlapping, orthogonal LP modes and the required least number of phase masks is the number of LP modes plus one.

* * * * *